US008646037B2

(12) United States Patent
Farsedakis

(10) Patent No.: US 8,646,037 B2
(45) Date of Patent: *Feb. 4, 2014

(54) PORTABLE IDENTITY RATING

(71) Applicant: Lewis Farsedakis, Boca Raton, FL (US)

(72) Inventor: Lewis Farsedakis, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,529

(22) Filed: Dec. 4, 2012

(65) Prior Publication Data

US 2013/0097678 A1 Apr. 18, 2013

Related U.S. Application Data

(63) Continuation of application No. 13/102,726, filed on May 6, 2011, now Pat. No. 8,359,631, which is a continuation-in-part of application No. 12/962,969, filed on Dec. 8, 2010, now Pat. No. 8,464,358.

(51) Int. Cl.
*H04L 9/32* (2006.01)

(52) U.S. Cl.
USPC .............................. 726/2; 726/3; 726/4; 726/5

(58) Field of Classification Search
USPC .............. 726/1–9, 26–30; 713/161–163, 168, 713/172
See application file for complete search history.

(56) References Cited

U.S. PATENT DOCUMENTS

| | | | |
|---|---|---|---|
| 5,657,389 A | 8/1997 | Houvener | |
| 5,719,560 A | 2/1998 | Watkins | |
| 5,771,291 A | 6/1998 | Newton et al. | |
| 5,872,848 A | 2/1999 | Romney et al. | |
| 6,035,402 A | 3/2000 | Vaeth et al. | |
| 6,104,815 A | 8/2000 | Alcorn | |
| 6,421,724 B1 | 7/2002 | Nickerson et al. | 709/224 |
| 6,466,917 B1 | 10/2002 | Goyal et al. | |
| 6,714,944 B1 | 3/2004 | Shapiro et al. | |
| 6,822,954 B2 | 11/2004 | McConnell et al. | |
| 6,853,973 B2 | 2/2005 | Mathews et al. | |
| 6,965,868 B1 * | 11/2005 | Bednarek | 705/7.14 |
| 7,269,737 B2 | 9/2007 | Robinson | |
| 7,367,049 B1 | 4/2008 | Robinson et al. | |
| 7,499,875 B1 | 3/2009 | May et al. | |
| 7,516,483 B2 | 4/2009 | Brennan | |
| 7,590,859 B2 | 9/2009 | Brennan | |
| 7,836,485 B2 | 11/2010 | Robinson et al. | |
| 8,516,038 B2 * | 8/2013 | Jalon et al. | 709/203 |
| 2002/0015403 A1 | 2/2002 | McConnell et al. | |
| 2002/0016831 A1 | 2/2002 | Peled et al. | |
| 2003/0084331 A1 | 5/2003 | Dixon et al. | |
| 2005/0027672 A1 | 2/2005 | Arndt et al. | |
| 2005/0066290 A1 | 3/2005 | Chebolu et al. | |
| 2005/0216364 A1 | 9/2005 | Jurisic et al. | |
| 2006/0005263 A1 | 1/2006 | Hardt | |
| 2006/0015935 A1 | 1/2006 | Dixon | |
| 2006/0161435 A1 | 7/2006 | Atef et al. | |
| 2006/0248021 A1 | 11/2006 | Jain et al. | |
| 2007/0112775 A1 | 5/2007 | Ackerman | |
| 2007/0288464 A1 | 12/2007 | Silver | |
| 2007/0288755 A1 | 12/2007 | Bryant | |
| 2008/0082381 A1 | 4/2008 | Muller et al. | |
| 2008/0120717 A1 | 5/2008 | Shakkarwar | |

(Continued)

*Primary Examiner* — Hosuk Song
(74) *Attorney, Agent, or Firm* — Whitham, Curtis, Christofferson & Cook, P.C.

(57) ABSTRACT

Portable on-line identity verification technology includes, for example, portable widgets with an identity rating, and other on-line identification verification icons and identity rating scores.

18 Claims, 15 Drawing Sheets

(56) References Cited

U.S. PATENT DOCUMENTS

| | | |
|---|---|---|
| 2008/0207220 A1 | 8/2008 | Aaron |
| 2008/0209514 A1 | 8/2008 | L'Heureux et al. |
| 2008/0215346 A1 | 9/2008 | O'Cinneide et al. |
| 2009/0119299 A1 | 5/2009 | Rhodes |
| 2009/0132271 A1 | 5/2009 | Typaldos ............ 705/1 |
| 2009/0177597 A1 | 7/2009 | Dube et al. |
| 2009/0187417 A1 | 7/2009 | Lidestri |
| 2009/0210315 A1 | 8/2009 | Jean et al. |
| 2009/0287937 A1 | 11/2009 | Burden |
| 2009/0313138 A1 | 12/2009 | Ratnakar |
| 2009/0327057 A1 | 12/2009 | Redlich |
| 2010/0020952 A1 | 1/2010 | Leung |
| 2010/0122347 A1 | 5/2010 | Nadler |
| 2010/0205448 A1 | 8/2010 | Tarhan et al. |
| 2010/0235623 A1 | 9/2010 | Simpson |
| 2010/0274815 A1 | 10/2010 | Vanasco |
| 2011/0078550 A1 | 3/2011 | Nabutovsky |

\* cited by examiner

Web Page Title

What Is ID Rating? | How Can I Use It? | Plans & Pricing

John Smith — 341
Miami, Florida — 342

John has opted to share the following information to further verify his identity:

Address:
1234 Sunken Island Road
Miami, Florida 33137

E-mail:
johnboy38@gmail.com

— 343

John scored an 85 out of a possible 100 on his IDrating.
Additional details about John's IDrating can be viewed below.

| Scorecard | Last Updated On: 01/03/11 |
|---|---|
| Social Security Number | Verified |
| Home Address | Verified |
| Phone Number | Un-Verified |

Phone Number
This users phone number is VERIFIED as being tied to this users billing records.

— 350

— 344

85
01/03/11

- confirm your identity to anyone, anywhere
- convey trust and security
- portable IDrating badge to use on websites, docs, e-mails and more
- affordable, easy, safe and above all else... secure!

sign up now!

Please login below to manage your account.

E-mail
Password

*forget your password?*

Follow us on Twitter and Facebook to keep up with the latest news and feature updates.

FIG. 3L

PORTABLE IDENTITY RATING

FIELD OF THE INVENTION

This invention relates to the Internet, more particularly to identity verification on-line.

BACKGROUND OF THE INVENTION

There has for some years been known a problem of how one party online (such as one eBay user or one user of a dating website) can be assured that a counterparty on-line actually is who the counterparty describes himself as being.

In eBay's U.S. Pat. No. 6,466,917 issued Oct. 15, 2002 by Goyal et al., for "Method and apparatus for verifying the identity of a participant within an on-line auction environment", there is described a certain identity verification process and identity verified icon. Although the eBay.com website describes the availability of an identity verification process, what is offered thereon does not appear to have been widely taken up by eBay users.

The iconic New Yorker cartoon by Peter Steiner that, "On the Internet, nobody knows you're a dog" appeared in 1993. Since then, despite all the many Internet advances, there has continued to be an unmet need for identity verification technology for Internet use that is feasible and that users will want to take up. The existing conventional options are not user-centric, but rather are site-centric.

SUMMARY OF THE INVENTION

The present inventor has invented on-line portability of on-line identity ratings and identity verification icons that have been generated by identity assurance technology.

The invention in one preferred embodiment provides an on-line identity rating or identity verification icon customized to an on-line user having a claimed identity, having portability, the identity rating or identity verification icon being clickable by a counterparty to connect to an automated verification system to a record about the user, if and only if appearing on a website page that the user entered into the automated verification system as being authorized.

In another preferred embodiment the invention provides a widget comprising an identity verification score and/or an identity verification icon that relates to an identity claimed by an on-line user, the widget being accessible to the user for the user to insert onto a website page that is not within a website that created the widget.

The invention also in another preferred embodiment provides an on-line identity assurer customized to an on-line user who has a claimed identity underpinning the assurer, wherein the assurer is subject to copying by the user for presentation on a website page, where the assurer is used by a counterparty to access a first message that is generated by a computerized identity verification system and relates to the claimed identity of the user.

In another preferred embodiment, the invention provides an automated system comprising an Identity Rating website, comprising: an Identity Rating website homepage through which a plurality of users each respectively login through a secure login; a set of data stored for each user of the plurality of users, after having been received from the user, including at least name data, where the name data is locked-down; a badge-generator which, after the user has completed an Identity Rating testing process administered by the Identity Rating website, generates an IDrating badge specific to the user; a portal through which is received an indication by the logged-in user of at least one external website, including a specific URL for a specific web page of the external website, on which the user is posting the user's badge and where a counterparty will be able to view and click-on the user's badge; and a processor that, upon receiving a click-through by the counterparty on the user's badge on the external website, in real time generates an IDrating record customized to the user and displays the IDrating record to the counterparty; such as, e.g., inventive automated systems wherein the badge includes an on-line identity rating or identity verification icon generated by the system and customized to the user, the badge being clickable by the counterparty to connect to the IDrating record about the user, if and only if the click-through comes via a website page that the user entered into the system as having been authorized by the user; inventive automated systems including a processor which determines whether a click-through on a badge has arrived via an authorized website page which is on a table of website pages stored by the system as having been entered by the user into system; inventive automated systems including a privacy setting processor that receives from the logged-in user a set of privacy settings regarding display of the user's address, the user's email address, the user's avatar or profile picture, or a combination thereof, to the counterparty when the counterparty clicks through the badge posted on the external site to reach the system's IDrating record for the user; inventive systems wherein the badge comprises a widget having a dynamic date and time stamp; inventive systems including a table of data stored for a plurality of exterior webpages and websites on which the badge is posted simultaneously all of which are supported by the system simultaneously, and other inventive systems.

The invention in another preferred embodiment provides a method of operating a system with a portable identity-rating widget-based badge, comprising the steps, performed by a computer, a processor or other machine of: through an Identity Rating website, receiving a secure login by a user of a plurality of users, for the logged-in user, receiving a set of data, including at least name data; storing the data received from the user; locking-down the name data received from the user so that the name data is permanently not editable by the user; providing to the user an Identity Rating testing and receiving from the user each response by the user to the Identity Rating testing; after responses have been received from the user responsive to the Identity Rating testing, generating an IDrating widget-based badge specific to the user; providing to the logged-in user, for whom the badge has been generated, a portal through which is received an indication by the logged-in user of at least one external website, including a specific URL for a specific web page of the external website, on which the user is posting the user's badge and where a counterparty will be able to view and click-on the user's badge, without the counterparty needing to be logged-in to the Identity Rating website nor to have a password from the user, and wherein the counterpart may be a stranger to the user, including, e.g., inventive methods in which, upon receiving a click-through by the counterparty on the user's badge on the external website, in real time generating an IDrating record customized to the user and displaying the IDrating record to the counterparty; inventive methods wherein the system simultaneously supports a badge specific to one user being posted on a plurality of exterior webpages and websites, and other inventive methods.

In another preferred embodiment the invention provides a method of operating a system of portable identity-rating widget-based badges, comprising the steps, performed by a computer, a processor or other machine of storing a set of Identity Rating records, with each Identity Rating record being user-specific, and storing a set of records for portable identity-rating widget-based badges generated based on the Identity Rating records; via an Identity Rating widget-based badge that is on an exterior webpage or exterior website that is outside the system, receiving a click-through from a counter-party including receiving a set of data from the click-through; comparing the received set of data from the click-through against the stored records for portable identity-rating widget-based badges; and after the comparing, in real-time to the counterparty having clicked on the badge, returning to the counterparty a customized display, such as, e.g., inventive methods including generating a record for a new user when name data is received for the new user, and permanently locking-down the name data upon receipt from the new user; inventive methods including displaying to the counterparty, in the customized display, at least the user name associated with the badge (such as, e.g., inventive methods including displaying to the counterparty, in the customized display including at least the user name associated with the badge, also an Identity Rating score or an Identity Rating icon generated by the system for the user and a date on which the Identity Rating score or Identity Rating icon was generated); inventive methods wherein the respective badges posted on the exterior websites or webpages each include a date stamp showing at least date; inventive methods wherein the system communicates with at least one posted badge of a set of badges for which the system has stored records from when respective logged-in users associated with the respective badges entered indications of where their badges would be posted, and updates a date stamp of the badge (such as inventive methods wherein the system stores a record pertaining to a subscription time period for a respective user and screens for whether the user has an expired subscription, and for a posted badge associated with a user whose subscription has expired, the system omits to schedule the posted badge for dynamic updating of a date stamp on the badge and/or updates the posted badge to include an "expired-status" message); inventive methods wherein, if a malefactor has stolen or is otherwise trying to misuse a badge belonging to a user by posting the badge somewhere that was not authorized by the system's user to whom the badge belongs, then when the badge is clicked upon by a stranger-counterparty, what, if anything, viewable by the stranger-counterparty is otherwise than what is viewed when a valid, live badge is clicked upon (such as inventive methods wherein when a valid, live badge is clicked upon by a counterparty, the system returns a colorful image for the counterparty to view, but when a stolen badge is clicked upon by a stranger-counterparty, only a greyed image is seen by the stranger-counterparty); and other inventive methods.

BRIEF DESCRIPTION OF THE DRAWINGS

The invention may be appreciated with reference to the attached figure, without the invention being limited thereto:

FIG. 3A-3L are screen shots of exemplary web pages for a web site 10 (FIG. 1) useable in practicing the invention.

DETAILED DESCRIPTION OF A PREFERRED EMBODIMENT OF THE INVENTION

Figure 1:
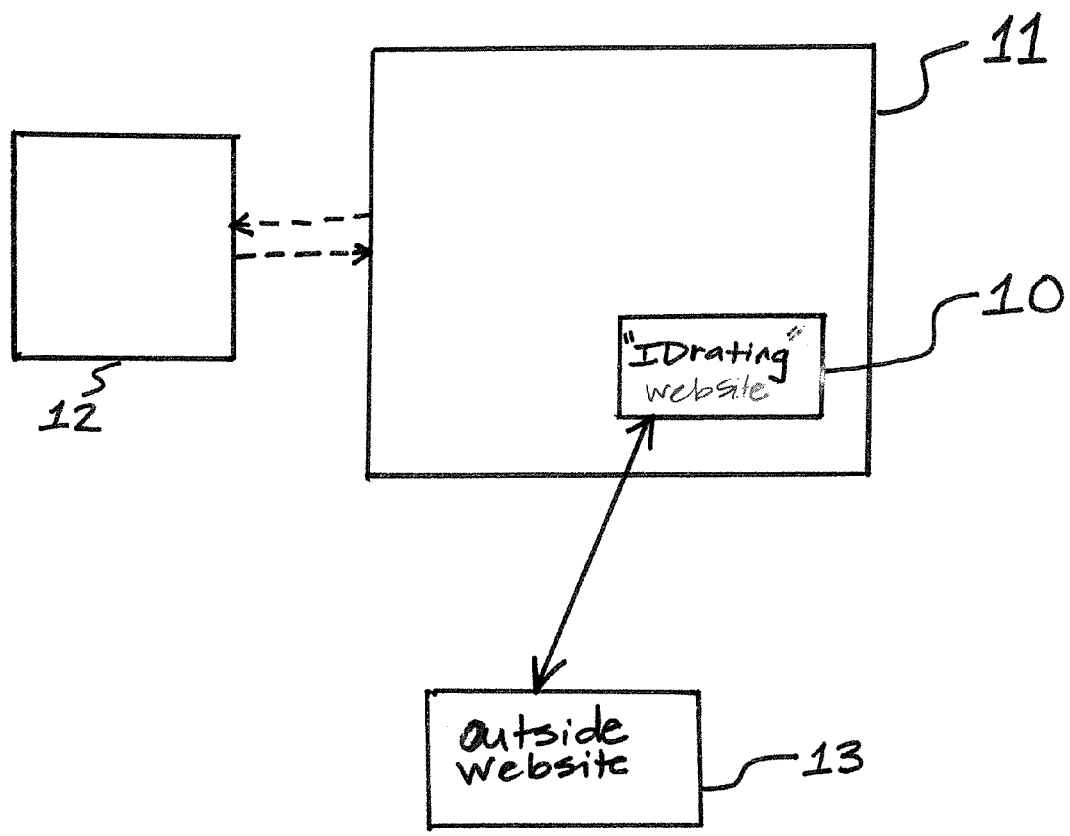
FIG. 1 is a diagram of an inventive embodiment in which "IDrating" website and "OutsideWebsite" are used by way of example, the invention not being limited to use of so named websites.
Figure 1A:
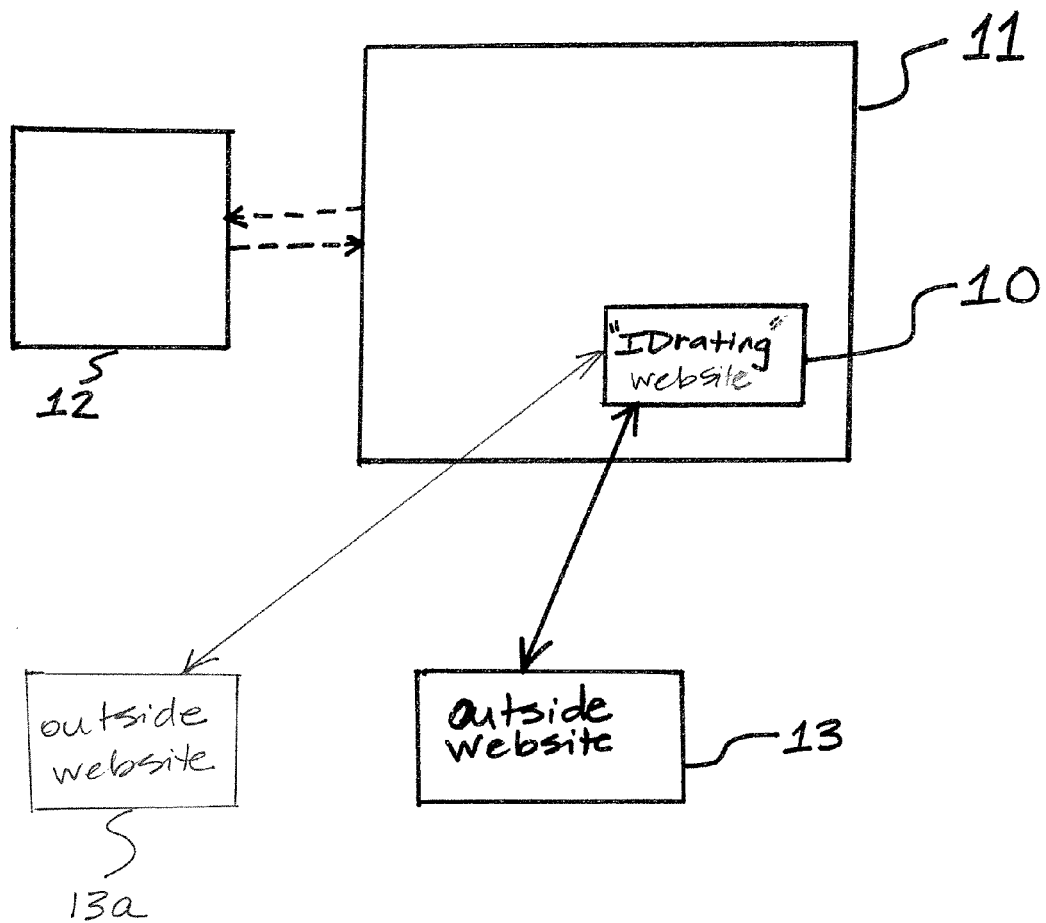
FIG. 1A is along the lines of FIG. 1, and in a case in which an identity-rating widget has been posted, by a user underlying the widget, on multiple outside web sites 13, 13a which are in operation at the same time.

For an on-line identity rating or identity verification icon customized to an on-line user having a claimed identity, portability now has been invented.

An example of an on-line user (such as, e.g., a user name that is connected up with an underlying email address which is not necessarily displayed on a website on which the user name is displayed) having a claimed identity is a claimed identity that has been entered by the user into a website that is part of a computerized system that issues an on-line rating or identity verification icon. Examples of parts of a claimed identity are, e.g., a name (such as a name comprising a first name, a middle name, and a last name), a mailing address, a date of birth, a social security number, etc.

In practicing the invention, a preferred example of an on-line user's claimed identity is an on-line user's claimed identity that has been verified to be an actual identity of exactly one living human, the actual identity having been so verified by other than the human himself or herself.

Examples of an on-line identity rating are, e.g., a numerical identity rating score (within 0-100) as shown on Buyerverse.com within the IDrating logo; a numerical identity rating score as described in U.S. patent application Ser. No. 12/486,398 which is U.S. patent publication no. 20100153278 published Jun. 17, 2010, by Lewis Farsedakis; etc.

Examples of an identity verification icon are, e.g., an identity verification icon as described on eBay.com; an identity verification icon as described in U.S. Pat. No. 6,466,917 (eBay); etc.

Examples of places to where a portable on-line identity or identity verification icon is placed by a user whose identity is verified thereby are, e.g., YouTube; eBay.com; a dating website; Buyerverse.com, Facebook.com; etc. which are examples of an outside website 13 (FIG. 1), i.e., a website which is separate from an identity-verification website. Although major websites have been mentioned as examples of an outside website on which a widget is used in practicing the invention, the outside website is not required to be a major website and the invention may be practiced including a user's placing a widget on less-famous or minor websites. Advantageously an automated system according to the invention permits a user to use his portable identification-verification widget on an outside website no matter how famous or minor it is. Outside web sites such as YouTube, eBay, Buyerverse, etc., are examples of a multi-user website in which each respective user has a unique web page with an exact unique URL. For example, one Facebook user may have a web page with an exact URL of www.Facebook.com/account/Lewis/1234567, another Facebook user may have a web page with an exact URL of www.Facebook.com/account/Sally/1234569, etc. The ".com" examples that have been given are non-limiting and the invention also may be practiced with an outside website with another suffix such as ".net", ".org", etc.

Preferably the automated system through which a widget is obtained by the customer (user) for him to export, presents to the user a customization option so that if the user is exporting the widget to certain major outside web sites, the user can make a widget choice customized to the outside website where the widget is to be used, such as a widget option customized for use on Facebook, a widget option customized for use on eBay, a widget option customized for use on Match.com, etc. For the automated system to so offer a customization step in which the widget is customized based on an outside web site on which the widget is to be used is optional, and in another embodiment, the automated system only presents the user with a generic widget and does not offer the user an option to customize the widget based on the outside website where the widget is to be used. In an automated system in which a user is offered a choice of customizing a widget that is to be used on a web site within a set of major web sites for which the automated system has stored information for effecting customization, it will be appreciated that preferably the user is not required to customize the widget, and also, preferably, the user can still obtain a widget useable on a web site outside the set of major web sites for which the automated system has stored customization instructions that can be effected. Preferably the automated system prescreens the web page exact URL that has been entered by the customer into the automated system and only offers the widget-customization option to the customer if the web page exact URL that has been entered by the customer is one for which the automated system supports widget-customization.

When the user does the identity-rating test, the automated system 11 validates that the user taking the test is the "correct" person vis-a-vis the self-descriptive information that the user has entered into the automated system 11 about himself. The widget thus obtained by the user for posting somewhere, such as on Craig's List, is used as follows. When a widget is posted on an outside website 13, such as on Craig's List, the widget-viewer essentially is wanting to see if this is a "real" person. When the widget-viewer clicks the widget, the widget-viewer is transported from the outside website 13 to the IDrating website 10 where the widget-viewer has an opportunity to see who the person represented by the widget is (assuming the user allows his photo and other personal information to be displayed by the automated system 11 to a widget-viewer). The photo and/or personal information for the user underlying the widget, and/or the absence of an accessible photo or personal information, may be useful to the widget-viewer in deciding whether or not, and/or how, to transact further with the user underlying the widget.

The invention is useable in a case of a dating service, with one example being as follows. A dating service user sees a profile on a website 13, wherein the profile is of another dating service user and includes a widget that user of the posted profile obtained from an automated system 11. The profile-viewing user clicks on the IDrating widget, that is included as part of the profile on the website 13, to confirm that the profile posted on the website 13 is for at least a real person, and preferably for a real person who is the correct person. For example, if the widget includes the name of the user, verification that the person is real and correct can be obtained. In another example, the widget may omit the name of the user (such as if, for example, the user has so opted for privacy reasons), and the viewer of the widget thus verifies at least that there is a real person associated with the widget and further verifies such details, if any, that the user underlying the widget has authorized the automated system 11 to disclose to a widget-viewer.

As to the widget, most preferably the automated system 11 provides to a test-taking user who has taken tests, successfully, to obtain a identification rating widget, a widget that includes at least an identity rating score and/or identity verification icon. Also preferably, the automated system 11 preferably offers to the user an option for the user's name to be included on the widget, with the automated system 11 further preferably offering the user the option that the widget include only the user's first name, or the user's full name including last name.

Preferably the IDrating widget is dynamic in two respects, including that a counterparty can click on it to obtain pop-up of the user (associated with the widget)'s information, and also in that the widget has a current time and date stamp. In another inventive embodiment, the widget has a static date stamp. The dynamic date and time stamp is preferred for the widget, so that the counterparty can tell that it is "alive" and is "a valid widget" with just a glance. If a malefactor were to cut and paste a widget with a dynamic date and time stamp somewhere other than where the user of the widget authorized the widget to be, the copied widget does not continue to refresh with the current date and time. When a dynamic date/time stamp is used for a user's widget, preferably the automated system 11 maintains a subscription record for the user of the widget and when the subscription expires, the automated system 11 disables the feed that keeps the time/date stamp in real time and instead displays "subscription expired" or the like.

In some embodiments, optionally one or more other bars is included such as, e.g., a bar for bankruptcy records, a bar for criminal records, etc.

Advantageously, the invention provides a badge for use by a user, supplied by an inventive automated system, that is uploadable by the user to an outside website, the uploadable badge being within a range of what is uploadable onto the outside website, such as an outside website that receives uploaded pictures, text images, etc.

The invention may be further appreciated with reference to the examples below, without the invention being limited thereto.

EXAMPLE 1

In this inventive example, an IDrating website 10 (FIG. 1) is established which provides the public with a method of obtaining online identity verification services for a fee. The website 10, which is part of an automated system 11, provides the user a series of questionnaires and tests to fill out, which are synced with third party identification verification services 12 that return results to the system 11 in the form of a graded score which the system 11 uses to construct a dynamic widget badge/link that can be exported by the user and integrated by the user into websites, social networks, etc. such as website 13 with the expectation that a counterparty (whom the user wants to be assured of the user's identity) will click on the badge. Assuming that the user previously has performed the registration step required of him for registering his usage of the badge on an outside website, when the counterparty clicks the badge, the clicking of the badge loads the profile of the user who owns the badge, verifying that he is truly who he claims he is online.

In this example, one user's badge cannot be used successfully by a hijacker because unless the user who is the owner of the badge has entered into his account in system 11 the exact page on which the badge is to be recognized, any clicking via a badge from other than an entry in a user-specific table of authorized website pages maintained in the system 11 will not result in the website 10 providing the clicker with a profile for the user and optionally system 11 may send a "REJECT" message in a case of an attempted click-through via a badge code and an outside website page that does not appear in a table of registrations by the user for that badge code.

In this example, an identity verification website 10 is constructed which the user visits to begin the sign up process. The identity verification website 10 provides to the user, for the user to fill out, a basic registration form, after which the automated system 11 creates an account for the user who then may proceed with exploring the verification packages. The user is presented, by the website 10, with the different levels of verification services and pricing.

When the automated system 11 receives from the user the user's choice of one or more verification services, the automated system 11 provides the user with questionnaires and tests based on services chosen by the user.

When the automated system 11 receives from the user completed questionnaires and tests, the automated system 11 performs a scoring evaluation for the user, after which the automated system presents the user with a scoring page. The scoring page displays the score of each service and the user's new total IDrating score.

The automated system 11 compares the user's new total IDrating score to a required value for issuing a score badge, and if the user's new total IDrating score meets or exceeds the required value for issuing a score badge, the automated system 11 presents a "generate my score badge" message whereby the user can obtain his badge HTML code from the identity verification website 10.

The automated system 11 generates badge codes for users according to a rule of generating a unique code for each user.

A user who has access to his score badge, which is a unique badge code unique to that user, can paste his unique badge code in one or more various sites or communities online.

Once the user's unique score badge is pasted somewhere on line such as on an outside website 13, anyone clicking the badge will be directed to the user's public profile on the IDrating website. What, if anything, is seen by the party so clicking depends on whether the user has registered the outside website page 13 into his IDrating account as an authorized page with the system 11.

The user who is the owner of the IDrating profile may set privacy options on what information to display to the clicking party who is clicking on the outside page 13. For example, the user may set his public profile to enable or disable certain fields from appearing to a clicking party based on the user's preferences.

The IDrating badge is provided by the automated system 11 to the user in the form of a code snippet, which is unique to each user. When the user registers an outside website 13 in the user's account with the IDrating website 10 and places his badge code on the outside website 13, the badge when clicked-through by a clicker on that outside website 13 is subject to successful authentication by the IDrating website 10. The user-specific table of registrations (of outside websites 13 where the user has placed his badge) in the IDrating website 10 ensures that if the badge is somehow being used on an unauthorized website by an unauthorized user, the unauthorized user cannot get the benefit of the authentication from the system 11 (and correspondingly the clicker will be suspicious due to not having received an immediate authentication from system 11). When the click-through is in order by virtue of the user-specific table of registrations for the user including the website page from where the click-through is arriving, system 11 performs a successful authentication back to the clicker clicking on the badge in real-time in normal operating conditions.

When the IDrating badge is in use on an outside website 13 registered by the user in his account with the IDrating website 10, the score on the badge reflects the ID score that the IDrating website 10 shows as current, because the score is being dynamically generated in real time from the IDrating website 10. Relatedly, when a user updates his score on the IDrating website 10 (such as by having completed an additional verification level), his score will update immediately on all the websites 13 and locations where his badge is being displayed for which he registered his displays in his account in system 11.

EXAMPLE 2

Figure 2:
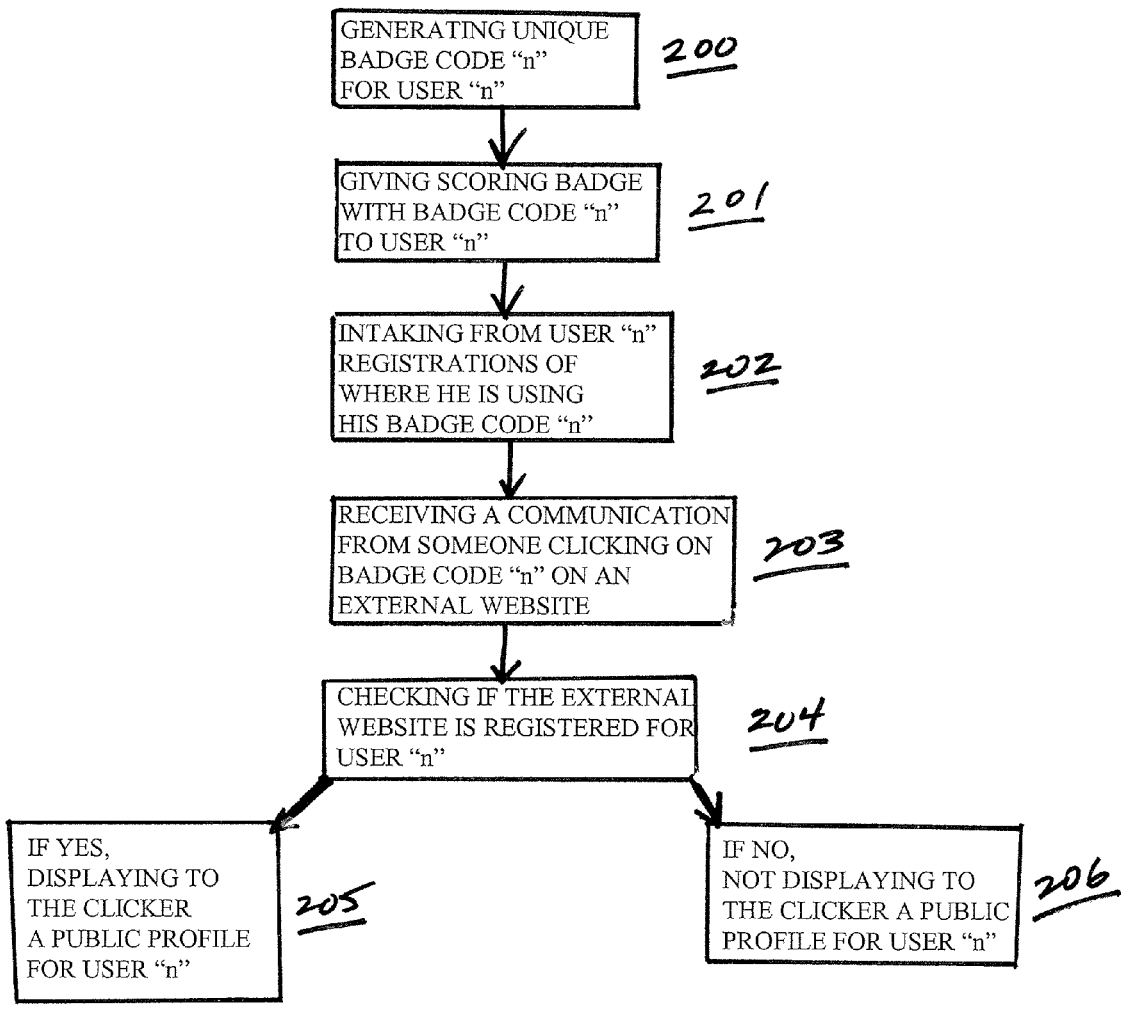
FIG. 2 is a flow chart of an inventive process performed by a computerized system (such as system 11 in FIG. 1).

In this example, as shown in FIG. 2, process steps are performed by a computerized system, such as system 11, which performs steps as follows, of: generating 200 a unique badge code "n" for user "n" (such as, e.g., the user in Example 1 who undergoes identity verification); giving 201 a scoring badge with the unique badge code to user "n"; intaking 202 from user "n" registrations of where he is using his badge code; receiving 203 a communication, as a result of someone having clicked on badge code "n" on an external website (such as website 13 in FIG. 1); and checking 204 if the external website is registered for user "n" before displaying to the clicker a public profile for user "n".

If the checking step 204 results in a YES determination that the external website is registered for the user "n" in the user-specific table of registrations maintained by the website 10, then the automated system 11 performs a step 205 of displaying to the clicker a public profile for user "n".

If the checking step 204 results in a NO determination that the external website 13 is NOT registered for the user "n", then the automated system 11 follows a rule of not displaying 206 to the clicker a public profile for user "n".

EXAMPLE 2A

In a case where the automated system 11 receives a click-through via a badge and ascertains that a registration is lacking in the user-specific table for the user whose code is in the clicked-through badge, preferably the system 11 performs a follow-up investigatory step.

EXAMPLE 3

In this example, a user posts his portable IDrating widget (that pulls his score from the IDrating site) to whatever outside site he wants, as follows:

1) The user (customer) visits the ID-rating website 10 (FIG. 1).

2) The user (customer) registers and does a series of tests.

3) The tests return a score, and the score is continuously pulled dynamically to an exportable widget. Thus, even if a widget was placed on Facebook today, and then 3 months from now the score changed, the widget will display the new score. This step of continuously pulling the score dynamically to an exportable widget is performed by a computer, processor, or the like.

4) The customer has several options of "widgets" that he can export to an outside site 13 (FIG. 1) or outside sites. The automated system gives the customer several options, with each option effecting a different optimization of the widget such as a widget optimization option for a widget to be used on Facebook, a widget optimization option for a widget to be used on eBay, a widget optimization option for a widget to be used on Match.com, a widget optimization option for a widget to be used on another major website, etc.

5) What the customer actually exports is a snippet of code that he places on a specific web page. The customer enters that web page's exact URL (for example, www.Facebook/account/Lewis/1234567 as opposed to simply www.Facebook.com) on the IDrating website where the IDrating website prompts the user to enter such information. A user obtains the exact URL of the outside website's web page that he wants to enter into the IDrating website by, for example, preferably pulling up his web page on the outside web page followed by copying the exact web page URL from where that information displays on-screen for the user. By the user's so entering, into the IDrating website, the exact web page URL of the outside website on which the user plans to use the widget, that is how the inventive automated system knows a particular widget is supposed to be there on the outside website and authenticates a particular page/IDrating widget. Otherwise, if someone were to copy an IDrating widget and paste the copied IDrating widget somewhere else besides where the IDrating customer wanted it to be, the inventive automated system will display an unverified message, as opposed to taking the viewers to the customer's IDrating page which confirms which tests the IDrated customer passed, shows the IDrated customer's picture, etc. when the correct widget is on the correct page.

6) The customer's IDrating page (that a user will be shown when clicking on his IDrating widget) gives the customer some options as to what they can elect to show, for example, home address versus just city or state, his skype, Facebook etc. accounts. For some other items the automated system does not give the customer an option of whether that information displays, such as, e.g., which tests they passed or failed, etc.

EXAMPLE 3A

Figure 3A:
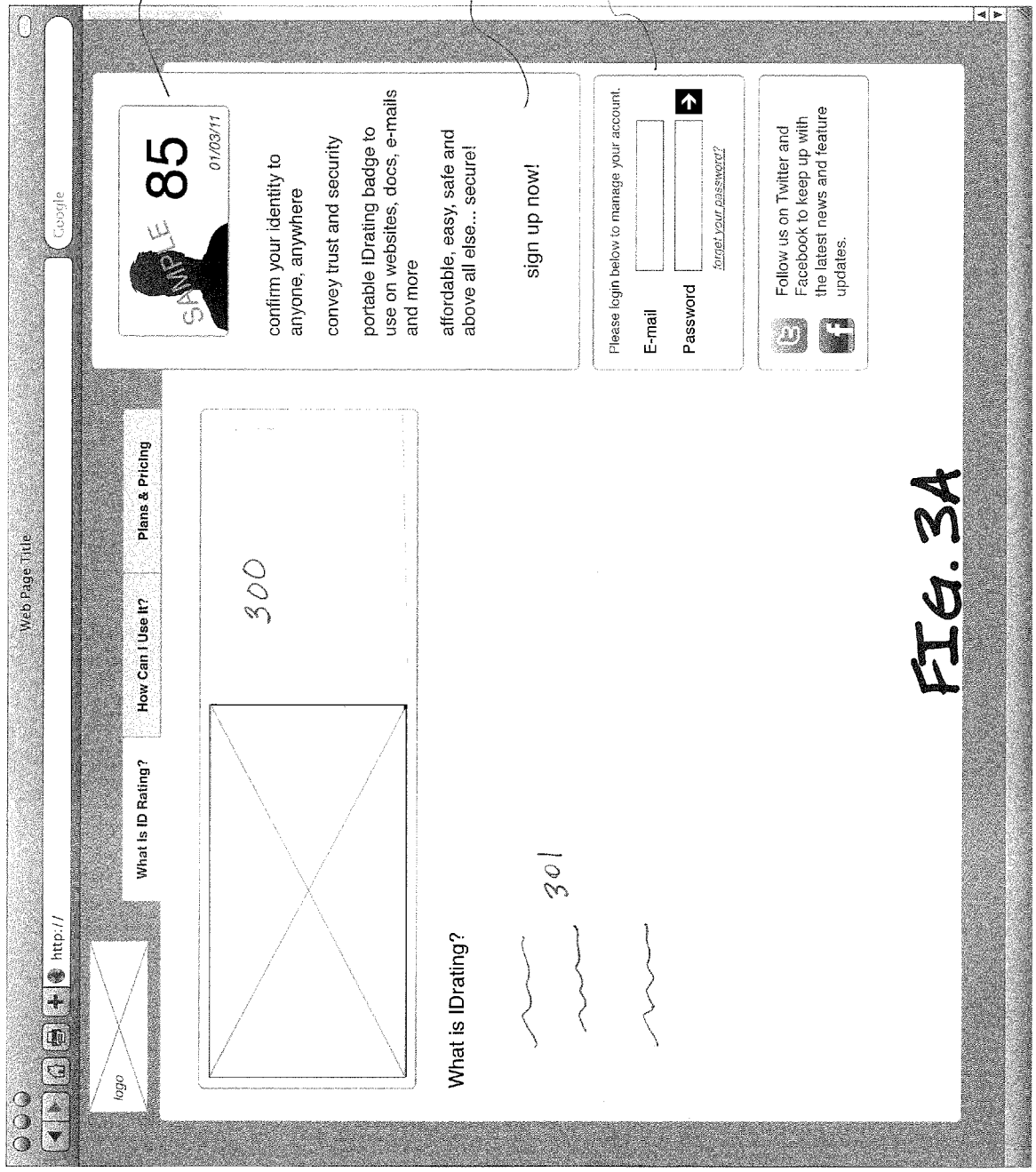
Figure 3B:
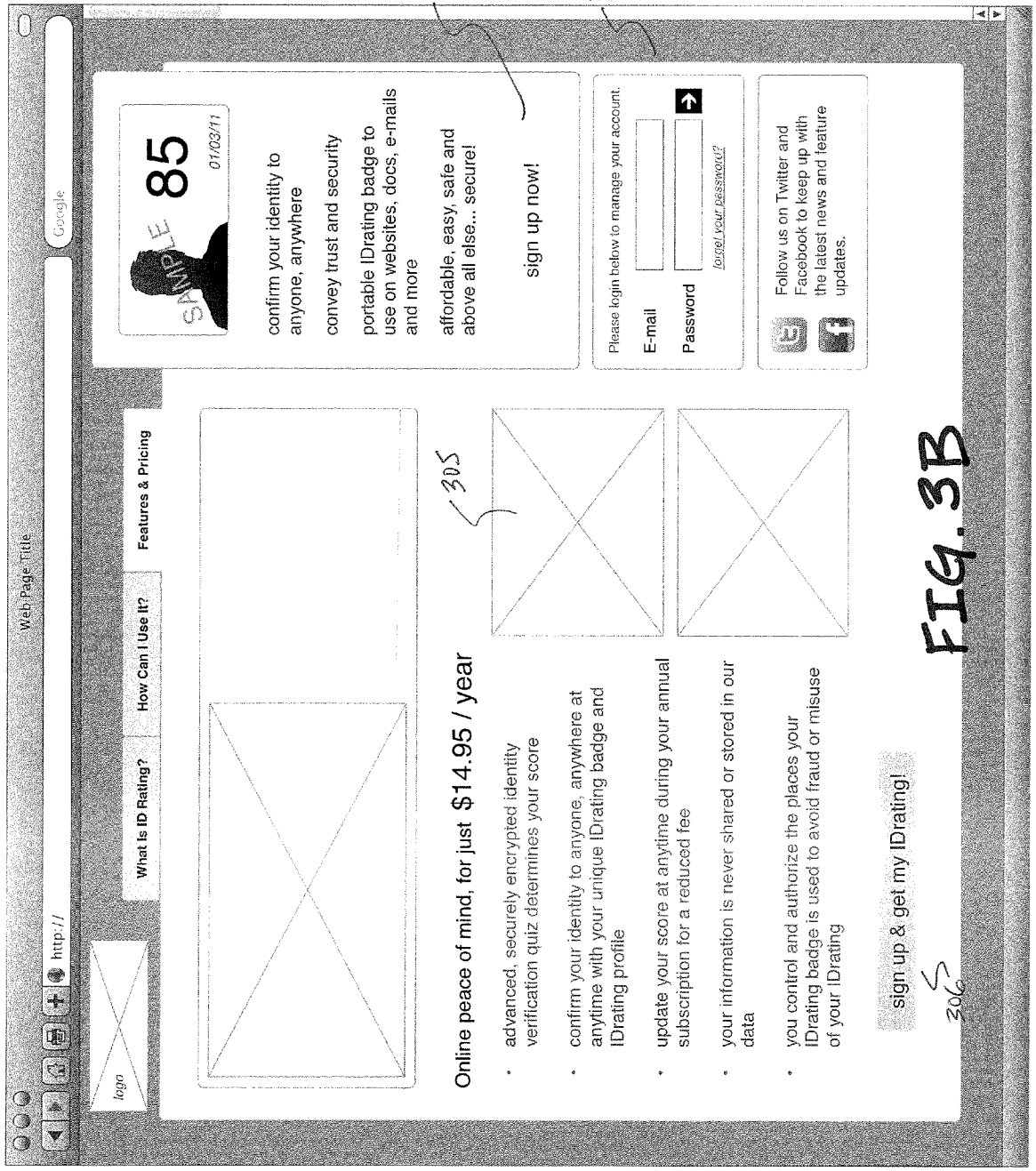

An IDrating website 10 is practiced, in this example, using website pages along the lines of FIGS. 3A-3L. The home page (FIG. 3A), which is also the "What is ID Rating?" web page, includes an attention-grabbing message 300, text 301 explaining what ID Rating is, a sample IDrating badge 302, a log-in 303 and a sign-up button 304. FIG. 3B, the "Features & Pricing" web page, includes featured screenshots 305 of Quiz, Badge Authorization, etc. and a further sign-up button 306.

Figure 3C:
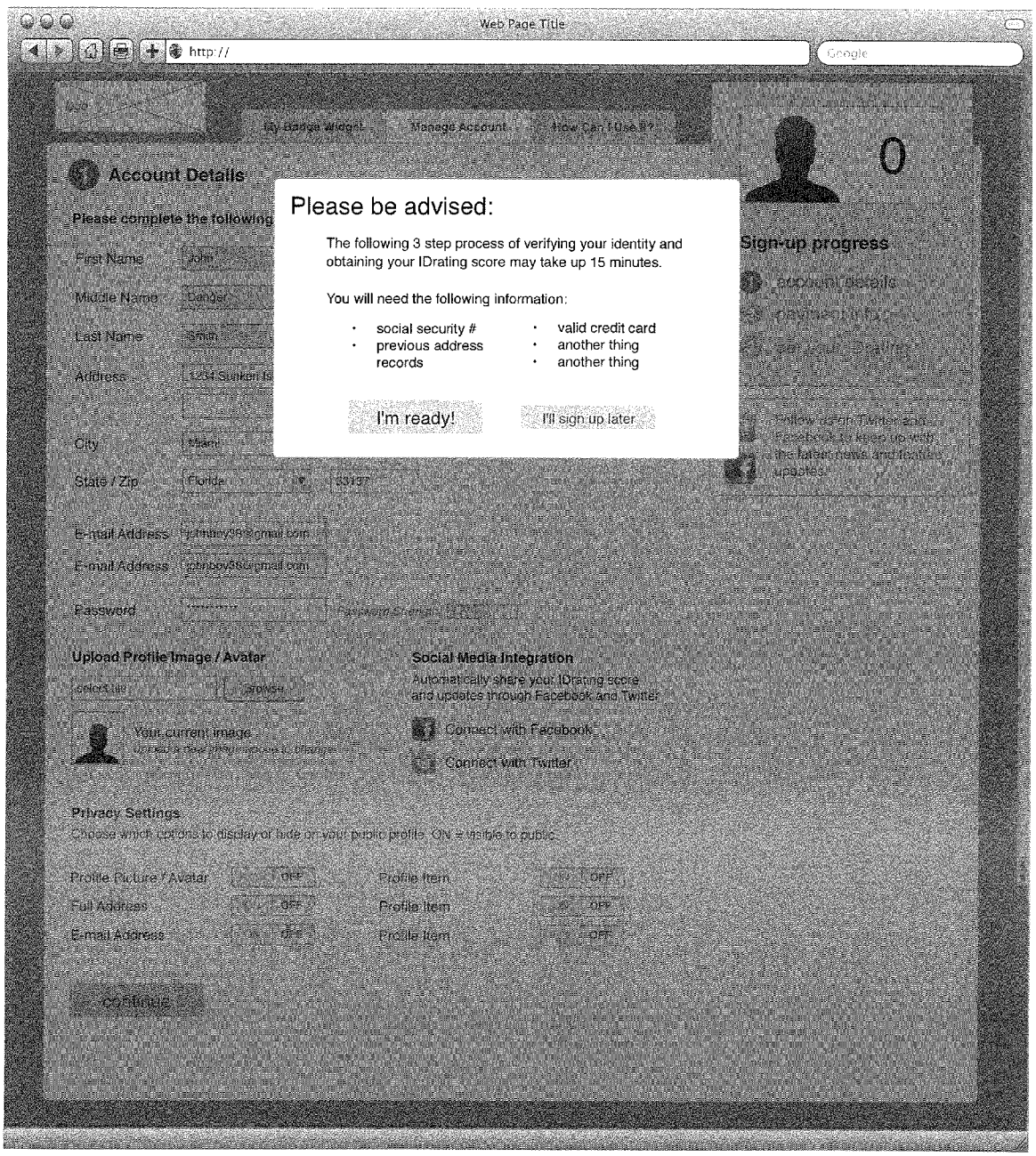

If the user clicks to sign-up for identity verification, the user is shown a screen along the lines of FIG. 3C notifying the user of an expected amount of time for the user to obtain his IDrating score, and information that the user will need to supply.

Figure 3D:
Figure 3E:
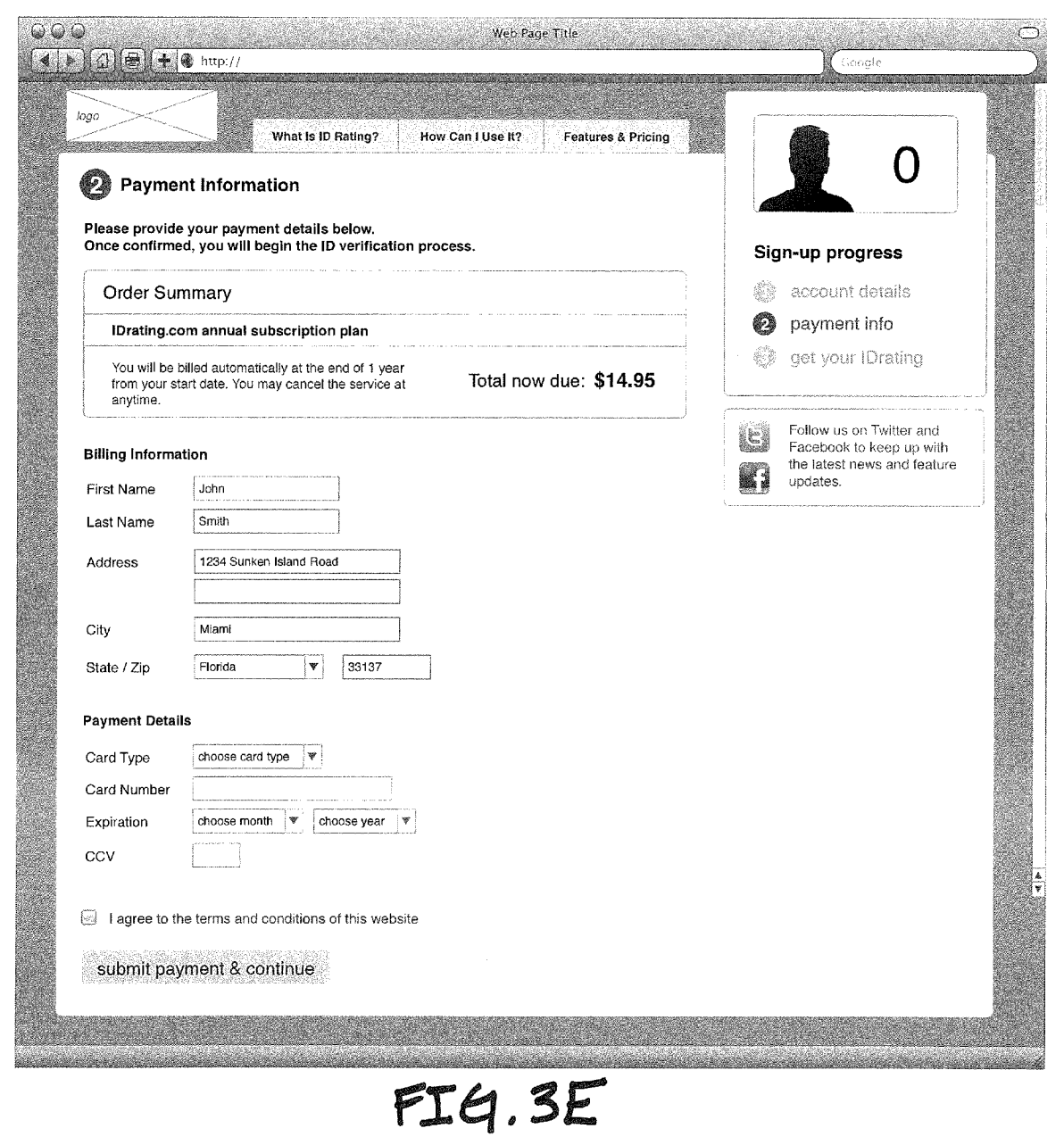
Figure 3F:
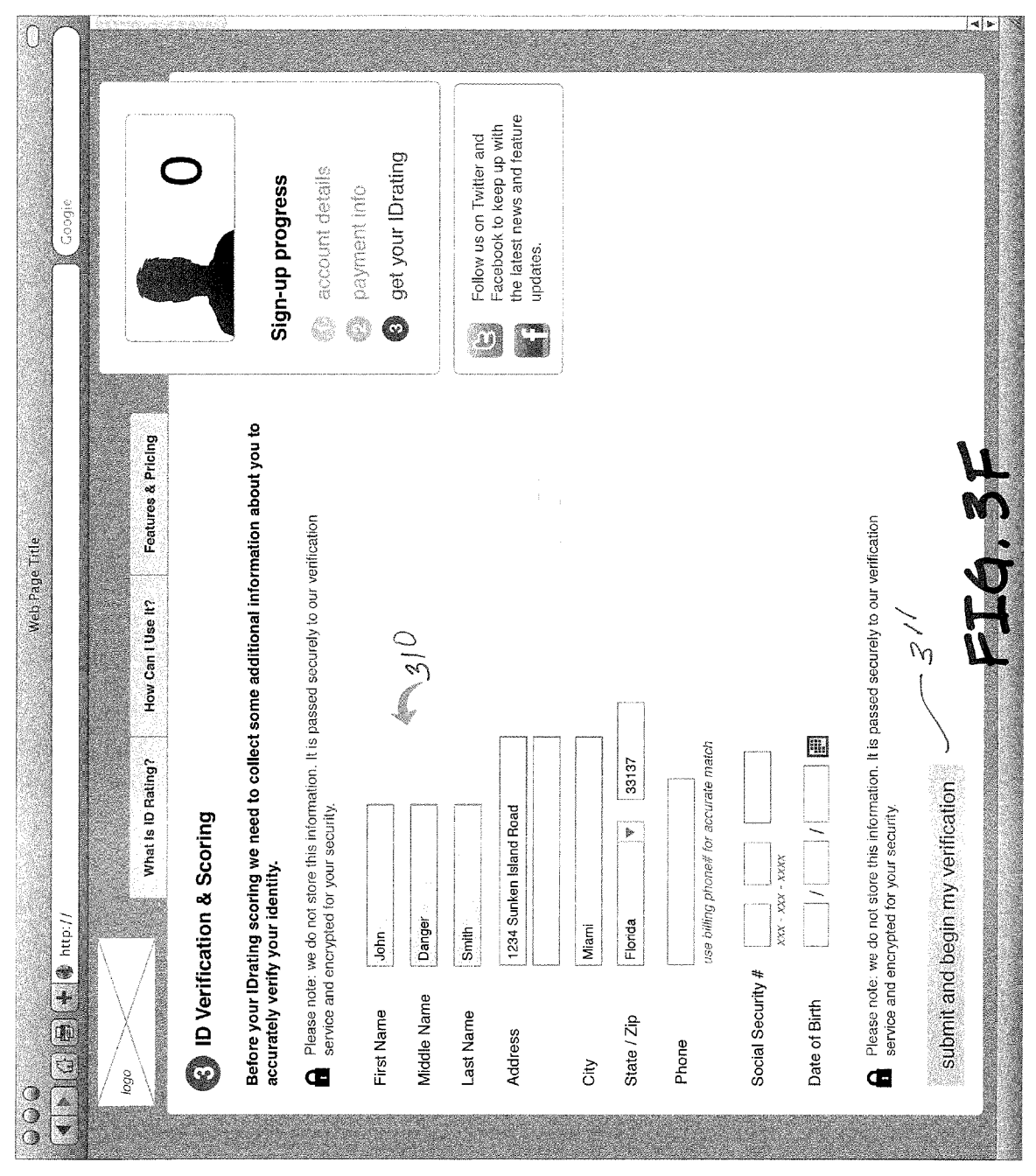
Figure 3G:
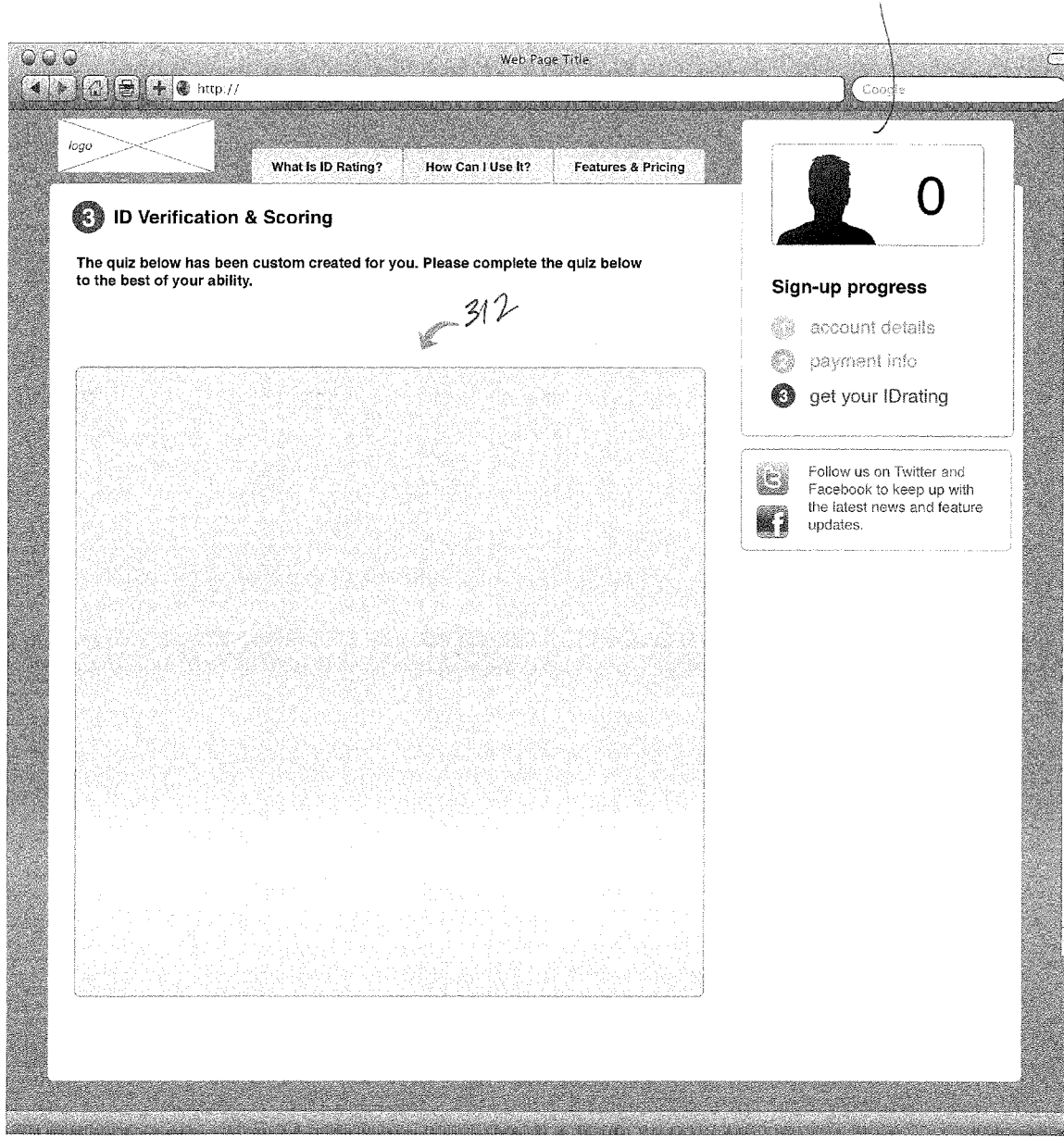

FIG. 3D is a screen that receives the user's Account Details as part of the sign-up process, after which FIG. 3E is a screen that receives the user's Payment Information, after which FIG. 3F is a screen that is part of the sign-up process and that is ID Verification and Scoring. The user's name information collected in step 1 is passed through to the form and shown in the ID Verification & Scoring as the name information 310 in FIG. 3F where the name is locked-down, i.e., NOT editable by the user. The user's address and telephone number from the previous step is also passed through to FIG. 3F but in FIG. 3F the address and telephone information is editable by the user.

When the user clicks on the "submit and begin my verification" button 311 (FIG. 3F), next the automated system presents the user with a screen (FIG. 3G) that includes a quiz module 312, such as a quiz module from Lexis Nexis. Before the user takes the quiz 312, the user has a zero identity rating 313.

Figure 3H:
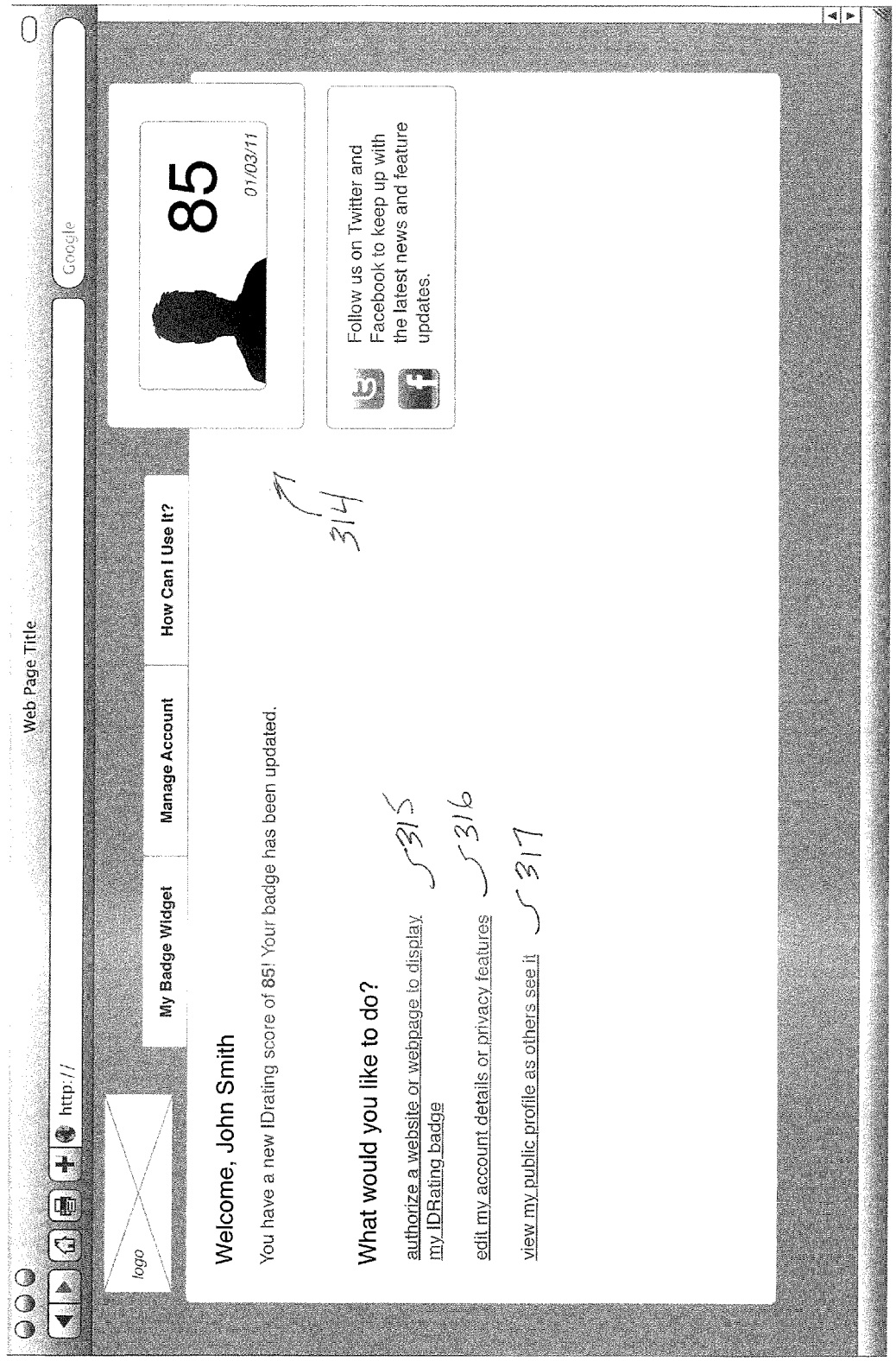

After the user has completed the quiz 312, he is shown a screen, FIG. 3H, that tells him his new IDrating score and his badge 314 which on login updates to a badge of the logged-in user, and promotional bullets and sign-up go away. The post-test web page (FIG. 3H) asks the user "What would you like to do?" and lists clickable buttons for "authorize a website or web page to display my IDrating badge" 315, "edit my account details or privacy features" 316 and "view my public profile as others see it" 317.

Figure 3I:
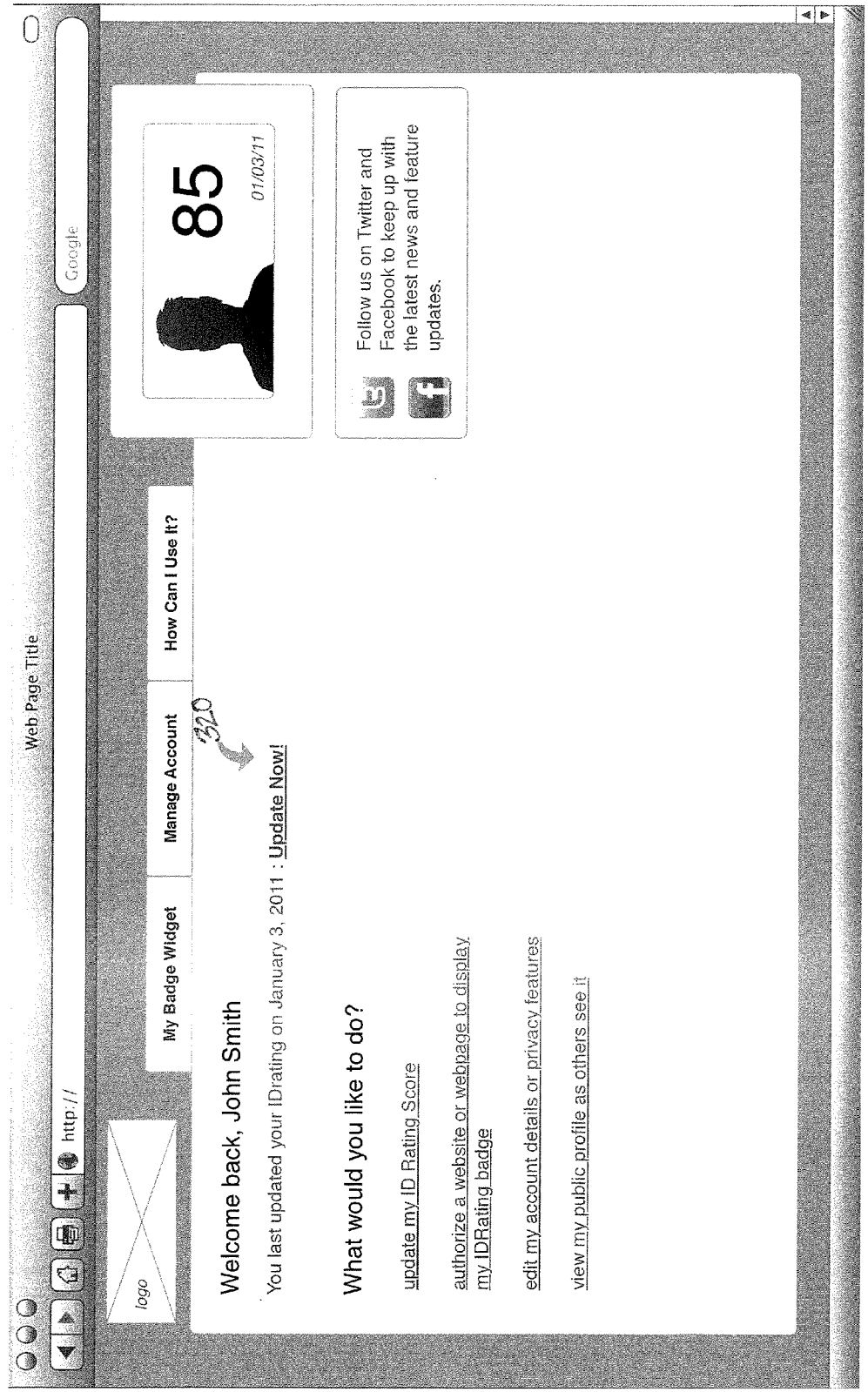

FIG. 3I is a web page shown to a returning user who already has an IDrating. The automated system for the IDrating website stores a leadtime instruction, and compares the present date with the date that the user last updated his rating for whether a set leadtime has occurred, based on the set leadtime, a message 320 is displayed telling the user to update his IDrating. On FIG. 3I, the date that the user last updated his rating is 01/03/11 as shown in the IDrating badge.

Figure 3J:
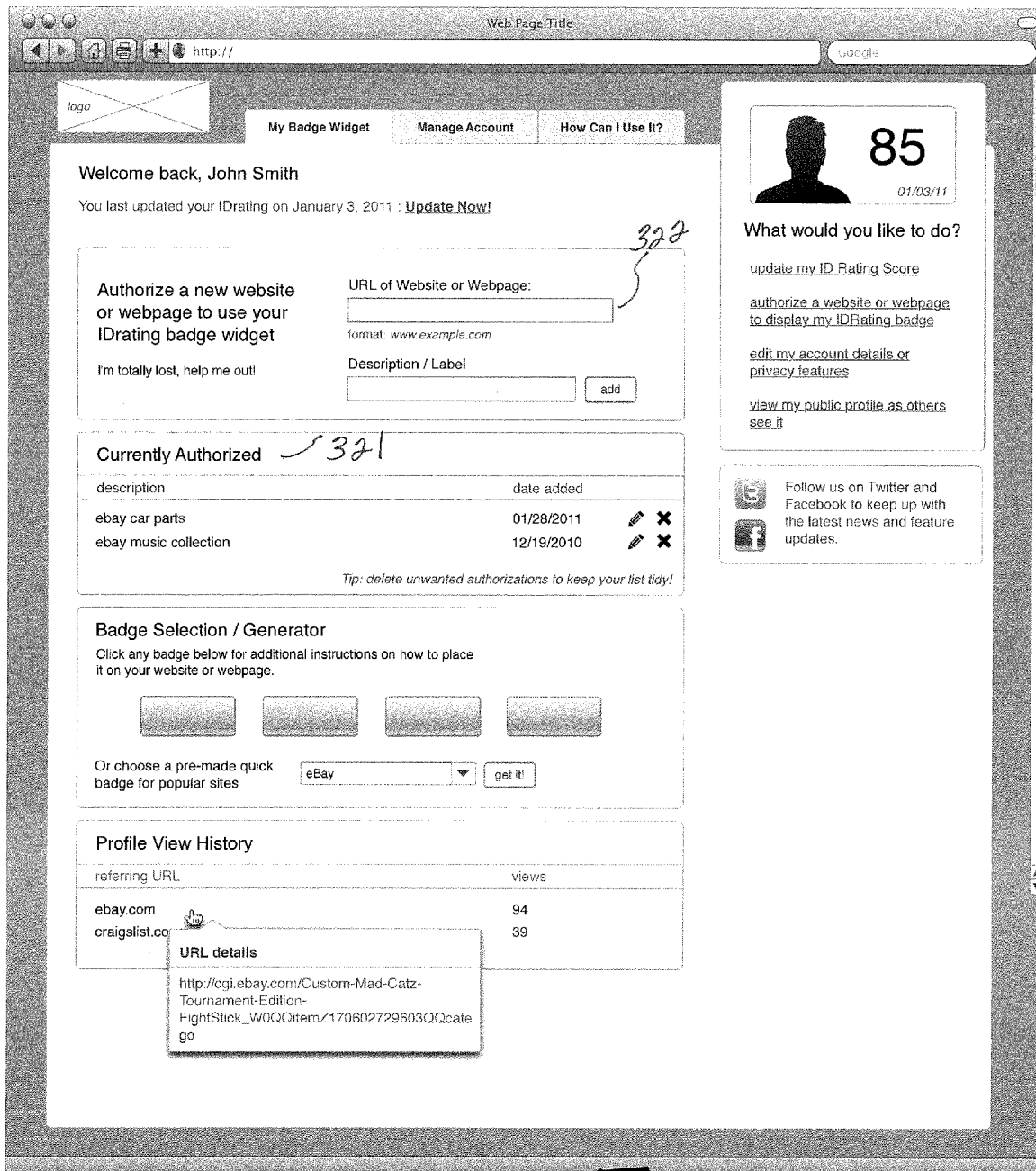

FIG. 3J is a web page that the automated system presents to the user with an IDrating score for the user to authorize a website or webpage that is "new" (i.e., not already in the "Currently Authorized" section 321 of the web page) to use the user's IDrating badge widget. The web page (FIG. 3J) includes a box 322 that receives the user's input of a URL of a website or web page where the user wants to use his IDrating badge.

Figure 3K:
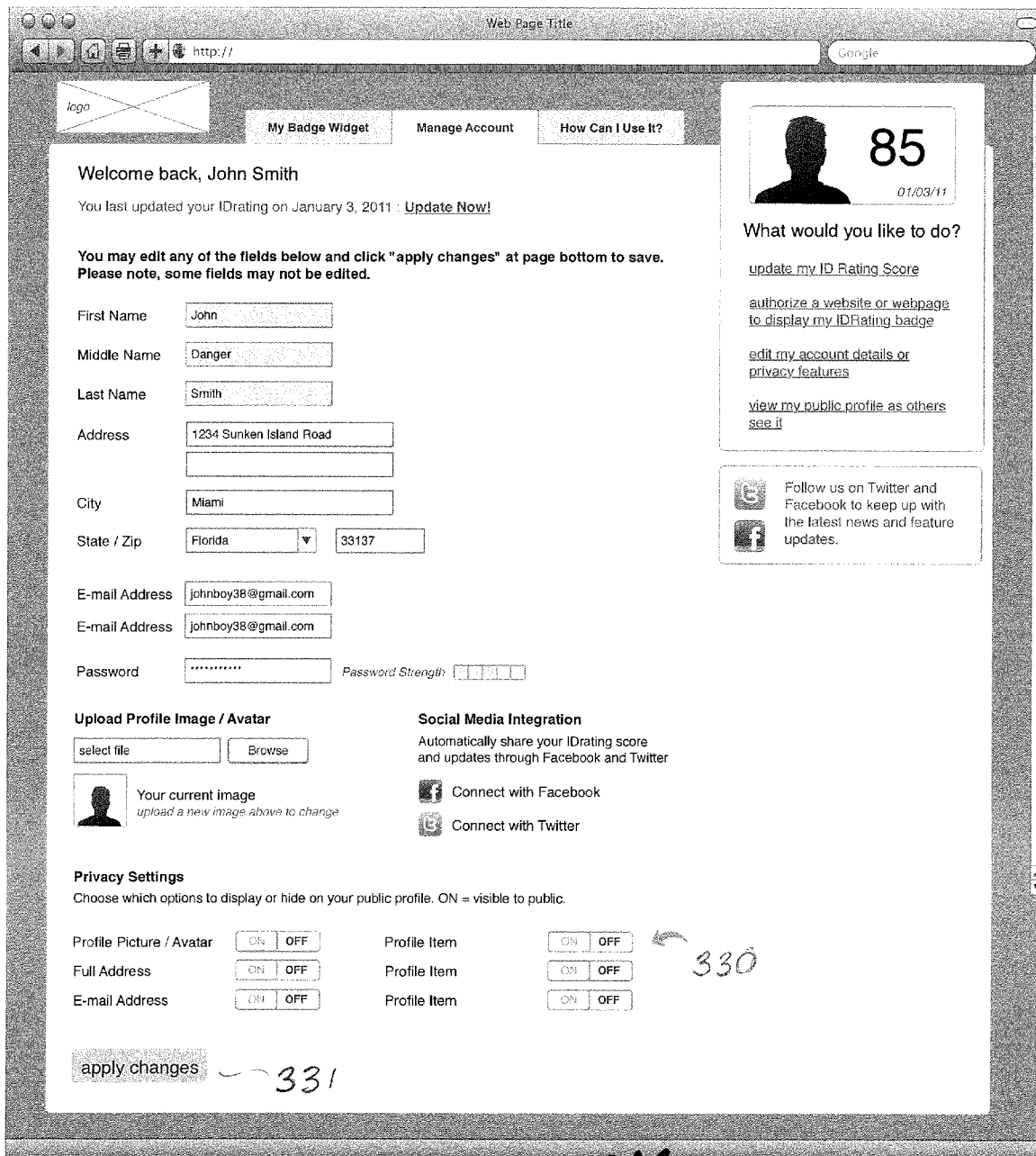

FIG. 3K is a web page that the automated system presents to the user who has an IDrating score for the user to edit his account details (except for name, which is locked-down) and set his privacy settings. On this web page (FIG. 3K), the user for easy settable option uses a respective, easy ON/OFF switch 330 to show or hide his personal information on his badge that is to be viewable on outside web sites 13, 13a as registered by the user by entry into box 322 (FIG. 3J). In this example of an automated system, the user has an option to hide or display his profile picture/his avatar; an option to hide or display his full address and an option to hide or display his email address, with the respective hide/display options being exercisable independently of each other. The web page (FIG. 3J) includes a clickable "apply changes" button 331 for the user to click once the user is satisfied with the privacy settings.

FIG. 3L is a web page that the automated system shows to someone who has clicked on the IDrating badge for the user of FIGS. 3A-3K on an outside website that the user has entered into IDRating automated system as an authorized web site or web page. The web page (FIG. 3L) displayed to the badge-viewer includes the name 341 of the user associated with the clicked-on badge and the city and state 342 of the user with the clicked-on badge. When the user, in this example John Smith, has set his privacy settings for his full address and email to appear, the web page (FIG. 3L) shown to the badge-clicker includes the user's full address and email 343. The web page (FIG. 3L) shown to the badge-clicker includes a scorecard 344 that shows the badge-clicker, in this example, that the IDrating system verified the social security number for the user for whom the automated system created the badge and verified the home address for the user, and has not verified the phone number for the user. Preferably each line item on the scorecard 344 when moused-over causes appearance of an explanation such as "Phone Number" explanation 350 of what it would mean if "Verified" is shown for that item in the scorecard 344.

EXAMPLE 4

In this example, the portable Identity Rating widget is customized for use by a parent posting the widget on a site used by the parent's child with the parent's permission. In this example, an inventive automated system presents a logged-in user who has completed the Identity Rating test process with an additional widget option that he can export, with an additional color bar, such as an additional color bar below the standard version, plus a word such as "dependent", "child", or the like. A user who is a parent posts such a child-version widget on sites that his child uses, so that one parent whose child is using a website can obtain confirmation of the identity of the parent of the other website user, as opposed to having to wonder if the child is chatting to a malefactor pretending to be a child.

EXAMPLE 5

In this example, three safeguards are used, as described from a perspective of a counterparty clicking upon the badge: (1) that the counterparty finds the badge has an ability to be clicked on, (2) that the counterparty after clicking on the badge sees a color version of the user's profile page, and (3) that the counterparty after clicking on the badge sees a current time and date stamp. When the counterparty clicks on a badge, and immediately sees a color version for the user's profile page and a current time/date stamp, that indicates to the counterparty that the badge is alive and has been clicked-upon somewhere that the badge's true owner, the user associated with the badge in the automated system supporting the badge, has authorized the badge to be.

It should be appreciated that variations and modifications from the embodiments set forth above may be made without departing from the spirit of the invention, and that such modifications are to be considered within the present invention.

What I claim is:

1. An automated system comprising an Identity Rating website, comprising:
   an Identity Rating website homepage through which a plurality of users each respectively login through a secure login,
   a set of data stored for each user of the plurality of users, after having been received from the user, including at least name data, where the name data is locked-down;
   a badge-generator which, after the user has completed an Identity Rating testing process administered by the Identity Rating website, generates an IDrating badge specific to the user;
   a portal through which is received an indication by the logged-in user of at least one external website, including a specific URL for a specific web page of the external website, on which the user is posting the user's badge and where a counterparty will be able to view and click-on the user's badge;
   a processor that, upon receiving a click-through by the counterparty on the user's badge on the external website, in real time generates an IDrating record customized to the user and displays the IDrating record to the counterparty.

2. The automated system of claim 1, wherein the badge includes an on-line identity rating or identity verification icon generated by the system and customized to the user,
   the badge being clickable by the counterparty to connect to the IDrating record about the user, if and only if the click-through comes via a website page that the user entered into the system as having been authorized by the user.

3. The system of claim 1, including a processor which determines whether a click-through on a badge has arrived via an authorized website page which is on a table of website pages stored by the system as having been entered by the user into system.

4. The system of claim 1, including a privacy setting processor that receives from the logged-in user a set of privacy settings regarding display of the user's address, the user's email address, the user's avatar or profile picture, or a combination thereof, to the counterparty when the counterparty clicks through the badge posted on the external site to reach the system's IDrating record for the user.

5. The system of claim 1, wherein the badge comprises a widget having a dynamic date and time stamp.

6. The system of claim 1, including a table of data stored for a plurality of exterior webpages and websites on which the badge is posted simultaneously all of which are supported by the system simultaneously.

7. A method of operating a system with a portable identity-rating widget-based badge, comprising the steps, performed by a computer, a processor or other machine of:
   through an Identity Rating website, receiving a secure login by a user of a plurality of users,
   for the logged-in user, receiving a set of data, including at least name data;
   storing the data received from the user;
   locking-down the name data received from the user so that the name data is permanently not editable by the user;
   providing to the user an Identity Rating testing and receiving from the user each response by the user to the Identity Rating testing;
   after responses have been received from the user responsive to the Identity Rating testing, generating an IDrating widget-based badge specific to the user;
   providing to the logged-in user, for whom the badge has been generated, a portal through which is received an indication by the logged-in user of at least one external website, including a specific URL for a specific web page of the external website, on which the user is posting the user's badge and where a counterparty will be able to view and click-on the user's badge, without the counterparty needing to be logged-in to the Identity Rating website nor to have a password from the user, and wherein the counterpart may be a stranger to the user.

8. The method of claim 7, including, upon receiving a click-through by the counterparty on the user's badge on the external website, in real time generating an IDrating record customized to the user and displaying the IDrating record to the counterparty.

9. The method of claim 7, wherein the system simultaneously supports a badge specific to one user being posted on a plurality of exterior webpages and websites.

10. A method of operating a system of portable identity-rating widget-based badges, comprising the steps, performed by a computer, a processor or other machine of:
    storing a set of Identity Rating records, with each Identity Rating record being user-specific, and storing a set of records for portable identity-rating widget-based badges generated based on the Identity Rating records;
    via an Identity Rating widget-based badge that is on an exterior webpage or exterior website that is outside the system, receiving a click-through from a counterparty including receiving a set of data from the click-through;
    comparing the received set of data from the click-through against the stored records for portable identity-rating widget-based badges;
    after the comparing, in real-time to the counterparty having clicked on the badge, returning to the counterparty a customized display.

11. The method of claim 9, including generating a record for a new user when name data is received for the new user, and permanently locking-down the name data upon receipt from the new user.

12. The method of claim 10, including displaying to the counterparty, in the customized display, at least the user name associated with the badge.

13. The method of claim 12, including displaying to the counterparty, in the customized display including at least the user name associated with the badge, also an Identity Rating score or an Identity Rating icon generated by the system for the user and a date on which the Identity Rating score or Identity Rating icon was generated.

14. The method of claim 10, wherein the respective badges posted on the exterior websites or webpages each include a date stamp showing at least date.

15. The method of claim 10, wherein the system communicates with at least one posted badge of a set of badges for which the system has stored records from when respective logged-in users associated with the respective badges entered indications of where their badges would be posted, and updates a date stamp of the badge.

16. The method of claim 15, wherein the system stores a record pertaining to a subscription time period for a respective user and screens for whether the user has an expired subscription, and for a posted badge associated with a user whose subscription has expired, the system omits to schedule the posted badge for dynamic updating of a date stamp on the badge and/or updates the posted badge to include an "expired-status" message.

17. The method of claim 10, wherein, if a malefactor has stolen or is otherwise trying to misuse a badge belonging to a user by posting the badge somewhere that was not authorized by the system's user to whom the badge belongs, then when the badge is clicked upon by a stranger-counterparty, what, if anything, viewable by the stranger-counterparty is otherwise than what is viewed when a valid, live badge is clicked upon.

18. The method of claim 17, wherein when a valid, live badge is clicked upon by a counterparty, the system returns a colorful image for the counterparty to view, but when a stolen badge is clicked upon by a stranger-counterparty, only a greyed image is seen by the stranger-counterparty.

\* \* \* \* \*